United States Patent [19]
Koga et al.

[11] Patent Number: 5,414,573
[45] Date of Patent: May 9, 1995

[54] CASSETTE ACCOMMODATING TYPE ELECTRONIC DEVICE HAVING A PLURALITY OF WINDOWS FOR IDENTIFYING THE AMOUNT OF REMAINING TAPE AND THE SIDE LABEL OF THE CASSETTE ACCOMMODATED IN THE DEVICE

[75] Inventors: Noriyuki Koga, Chiba; Hisashi Hanzawa, Tokyo, both of Japan

[73] Assignee: Sony Corporation, Tokyo, Japan

[21] Appl. No.: 154,622

[22] Filed: Nov. 18, 1993

[30] Foreign Application Priority Data

Nov. 30, 1992 [JP] Japan ................... 4-343383

[51] Int. Cl.6 ............................................. G11B 5/008
[52] U.S. Cl. ......................................... 360/93; 360/96.5
[58] Field of Search ................... 360/96.1, 96.5, 96.6, 360/93

[56] References Cited

U.S. PATENT DOCUMENTS

| | | | |
|---|---|---|---|
| 4,580,181 | 4/1986 | Nakamura et al. | 360/96.1 |
| 4,692,825 | 9/1987 | Debaudringhien | 360/96.3 |
| 4,918,551 | 4/1990 | Yoshida et al. | 360/96.5 |

OTHER PUBLICATIONS

European Patent Application EP 0 203 784 A2, May 22, 1986 (Yoshida et al.).
European Patent Application EP 0 128 498 A1, Jun. 4, 1984 (Ida et al.).
German Patent Application DE 26 34 782 A1, Feb. 9, 1978 (Meiling).

*Primary Examiner*—A. J. Heinz
*Attorney, Agent, or Firm*—Jay H. Maioli

[57] ABSTRACT

A cassette accommodating type electronic equipment having an electronic equipment housing which comprises a cassette accommodating portion for accommodating therein a tape cassette in which a recording medium is accommodated, an opening portion through which the tape cassette is inserted into the cassette accommodating portion, a driving device for driving the recording medium accommodated within the cassette accommodated in the cassette accommodating portion, and a lid for opening and closing the opening portion, wherein the housing includes transparent windows formed through surfaces of at least two different portions so that two different portions of the tape cassette accommodated in the cassette accommodating portion can be visually confirmed.

8 Claims, 7 Drawing Sheets

CASSETTE ACCOMMODATING TYPE ELECTRONIC DEVICE HAVING A PLURALITY OF WINDOWS FOR IDENTIFYING THE AMOUNT OF REMAINING TAPE AND THE SIDE LABEL OF THE CASSETTE ACCOMMODATED IN THE DEVICE

BACKGROUND OF THE INVENTION

1. Field of the Invention

The present invention relates to a cassette accommodating type electronic equipment suitable for cassette tape players, disc players or the like, for example.

2. Description of the Related Art

In conventional cassette accommodating type electronic equipments using a cassette in which a recording medium or the like is accommodated, such as a cassette tape player using a tape cassette, a disc player using a disc cassette or the like, it is customary that a housing portion that accommodates therein a tape cassette or disc cassette has at its lid which serves as an upper surface side or at one surface portion of the side walls which serves as a peripheral side surface side a transparent window through which the user can visually confirm the tape cassette (see Japanese laid-open utility model publication No. 60-56995). Most of the cassette tape players include a transparent window formed through a lid side so that the user can visually confirm a tape remaining amount through such transparent window.

When the transparent window is formed only on the upper surface side of the housing portion that accommodates therein the tape cassette in such tape cassette player or the like as described above, the user cannot see a label area formed on the side wall of the tape cassette. Also, when the transparent window is formed only on the side surface of the housing portion which accommodates therein the tape cassette, the user cannot visually confirm the remaining amount of the tape. Therefore, some special means for displaying the remaining amount of the tape must be provided, which makes the tape cassette itself complicated in structure.

Accordingly, in order that the user can directly see the tape remaining amount and the label area when the tape cassette is accommodated in the tape. player, a transparent window of a large surface area must be provided on the surface of the lid supported by the housing portion in which the tape cassette is accommodated.

Because the window of large surface area is formed on the surface of one portion of the housing portion of the tape player, such as the lid or the like as described above, the housing portion of the tape player becomes weak in strength. It is customary that a portable tape player, in particular, has a predetermined strength. If the lid of the tape player is weak in strength, there is then the disadvantage that the tape cassette cannot be held stably in the portable tape player.

OBJECTS AND SUMMARY OF THE INVENTION

Therefore, it is an object of the present invention to provide an improved cassette accommodating type electronic equipment in which the aforesaid shortcomings and disadvantages encountered with the prior art can be eliminated.

More specifically, it is an object of the present invention to provide a cassette accommodating type electronic equipment in which surfaces of two portions of a tape cassette accommodated therein can be visually confirmed without deteriorating a strength of a housing portion.

It is another object of the present invention to provide a cassette accommodating type electronic equipment in which a tape remaining amount of a tape cassette and a label area thereof can both be visually confirmed when the tape cassette is accommodated in the cassette tape player.

It is still another object of the present invention to provide a cassette accommodating type electronic equipment in which recording state, reproducing state and contents of a tape can be visually confirmed simultaneously when applied to a cassette tape player.

It is a further object of the present invention to provide a cassette accommodating type electronic equipment in which marketability can be improved.

According to a first aspect of the present invention, there is provided a cassette accommodating type electronic equipment having an electronic equipment housing which comprises a cassette accommodating portion for accommodating therein a tape cassette in which a recording medium is accommodated, an opening portion through which the tape cassette is inserted into the cassette accommodating portion, a driving device for driving the recording medium cassette accommodated in the cassette accommodating portion, and a lid for opening and closing the opening portion, wherein the housing includes transparent windows formed through surfaces of at least two different portions so that two different portions of the tape cassette accommodated in the cassette accommodating portion can be visually confirmed.

In accordance with a second aspect of the present invention, there is provided a cassette accommodating type electronic equipment having a housing of a substantially rectangular solid configuration having a cassette accommodating portion in which a tape cassette having a recording medium accommodated therein is accommodated which comprises a drive device for driving the recording medium, an opening portion through which the tape cassette is inserted into said cassette accommodating portion, a lid member for opening and closing the opening portion and for forming a part of an outer side wall of the housing when closed, a cassette holder elevatedly supported to the cassette accommodating portion and elevatedly moved in unison with opening and closing operation of the lid member between a first position at which the cassette holder holding the tape cassette is accommodated in the cassette accommodating portion and a second position at which the tape cassette can be ejected from the cassette holder, and a battery loading portion in which a battery that supplies a driving voltage to the driving means is loaded so that the apparatus is portable, wherein the housing includes transparent windows formed through surfaces of at least two different portions so that two different portions of the tape cassette accommodated in the cassette accommodating portion can be visually confirmed.

The above and other objects, features, and advantages of the present invention will become apparent from the following detailed description of illustrative embodiments thereof to be read in conjunction with the accompanying drawings, in which like reference nu-

DETAILED DESCRIPTION OF THE PREFERRED EMBODIMENTS

Figure 1:
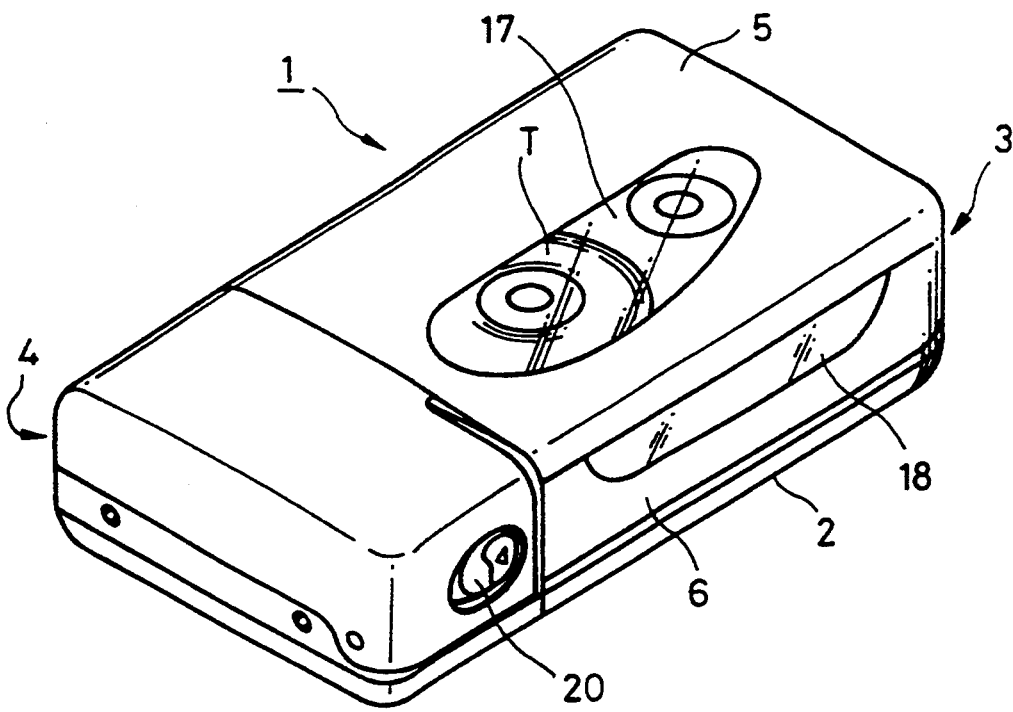
FIG. 1 is a perspective view of an example of a cassette tape player to which the present invention is applied.

The present invention will now be described with reference to the drawings, in which case the present invention is applied to a portable tape player.

As illustrated, there is shown an overall arrangement of a portable tape player which is generally depicted by reference numeral 1. The portable tape player 1 is mainly comprised of an outer housing 2, a tape cassette accommodating housing portion (hereinafter simply referred to as an accommodating housing portion) 3 and a battery accommodating portion 4 that adjoins the accommodating housing portion 3.

Figure 3:
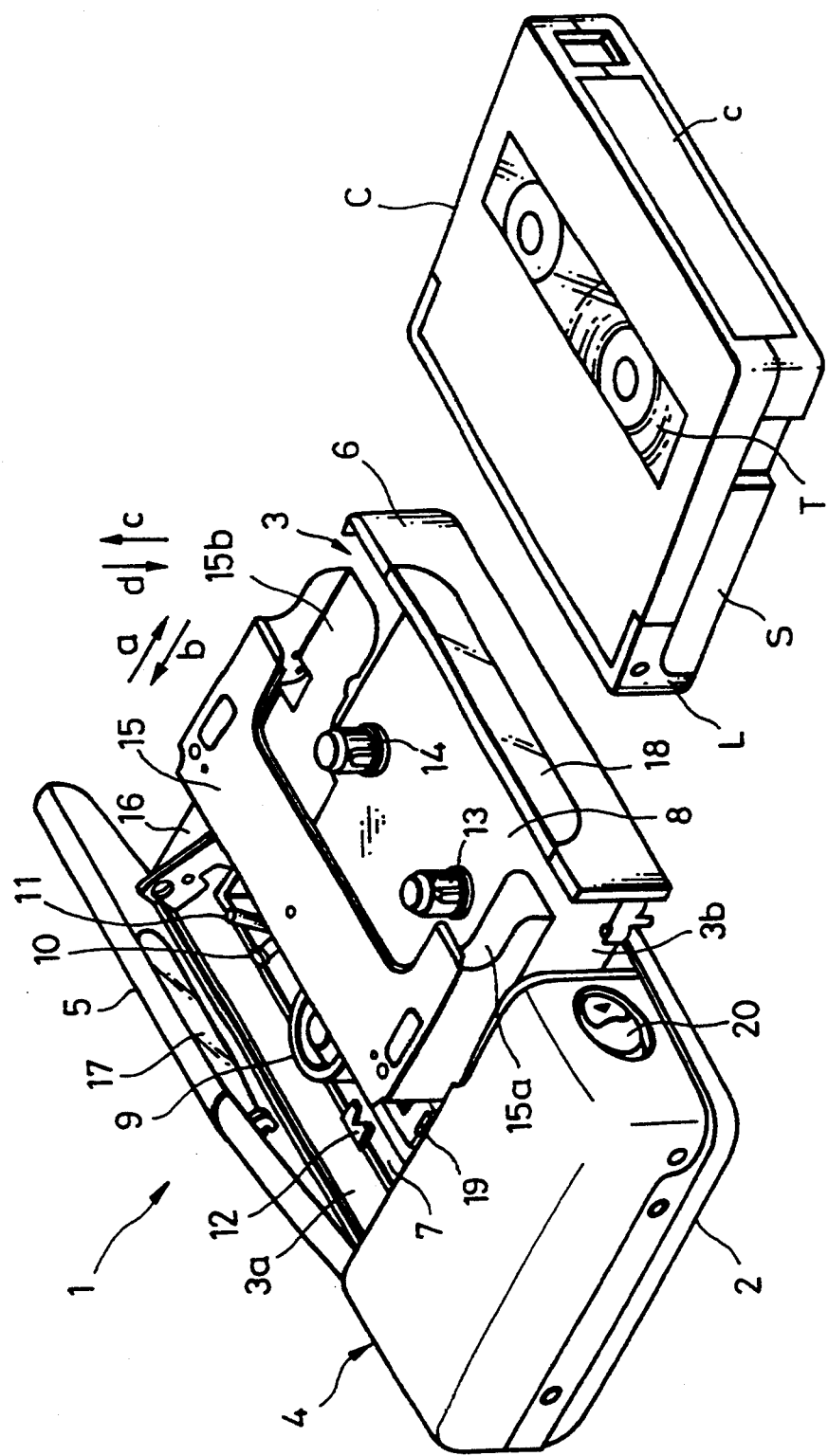
FIG. 3 is a perspective view showing the cassette tape player of FIG. 1 in which a tape cassette is to be accommodated.

As shown in FIG. 3, the accommodating housing portion 3 is exposed from an upper surface side 3a to a front surface side 3b. The upper surface side 3a is closed by a lid 5, and the front surface side 3b is closed by a front panel 6.

The accommodating housing portion 3 includes a main chassis 7 fixed on its bottom surface side, and a sub chassis 8 is engaged on the main chassis 7 so as to become slidable in the front and rear directions (directions shown by arrows a and b in FIG. 3). The main chassis 7 includes at its rear portion a rotary head cylinder 9 located at substantially the central portion thereof. A tape that was supplied from a tape cassette accommodated in the accommodating housing portion 3 is wound around the rotary head cylinder 9 over a predetermined angular extent.

With respect to the rotary head cylinder 9, there are provided at its one side an inclined roller guide 10 and an inclined guide 11 disposed along a tape transport path at a predetermined interval therebetween. Also, in connection with the rotary head cylinder 9, there is provided at the position near the other side thereof a stopper 12 of a substantially V-shaped configuration that positions a moving guide roller formed as one body with the main chassis 7.

The sub chassis 8 includes a supply reel drive shaft 13 and a take-up reel drive shaft 14. The sub chassis 8 further includes on its inner end portion side a group of moving guide rollers for forming a tape path on the rotary head cylinder 9 side disposed directly or via a rotary member and a sliding member, though not shown.

This portable tape player 1 includes a cassette holder 15 associated with the main chassis 7 and sub chassis 8 thus arranged. More specifically, the cassette holder 15 includes at its respective sides cassette insertion portions 15a, 15b, each of which has a U-shaped cross section in such a manner that the cassette holder 15 is coupled to and supported to the sub chassis 8 so as to become movable relative to the main chassis 7 in upward and downward directions (directions shown by arrows c and d in FIG. 3) and in forward and backward directions (directions shown by the arrows a and b in FIG. 3). The cassette holder 15 is engaged with the sub chassis 8 when it is lowered.

The lid 5 is pivotally supported at its rear surface portion to the rear portion of the main chassis 7 so as to open and close the upper surface side 3a of the accommodating housing portion 3. The lid 5 is engaged at its position distant from the rotation center with a cam plate 16 supported so as to become freely slidable in the forward and backward directions (directions shown by the arrows a and b in FIG. 3) with respect to the main chassis 7. The cam plate 16 is engaged with the cassette holder 15 and the cassette holder 15 is moved (i.e., elevated) in the upward and downward directions (directions shown by the arrows c and d in FIG. 3) when the cam plate 16 is slid in the forward and backward directions in unison with the rotation of the lid 5. In other words, the cassette holder 15 is moved upwardly when the lid 5 is rotated to be opened and moved downwardly when the lid 5 is rotated to be closed.

The front panel 6 is vertically secured to the front end portion of the sub chassis 8 and opens and closes the front surface side 3b of the accommodating housing portion 3 when the sub chassis 8 is slid in the forward and backward directions (directions shown by the arrow a and b in FIG. 3), i.e., the sub chassis 8 is withdrawn (moved in the direction shown by the arrow a in FIG. 3) and pushed backwardly (moved in the direction shown by the arrow b in FIG. 3).

The lid 5 and the front panel 6 that open and close the upper surface side 3a and the front surface side 3b of the accommodating housing portion 3 include transparent windows 17, 18 formed therethrough.

More specifically, the lid 5 includes the transparent window 17 formed at its portions facing the two reel drive shafts 13, 14 on the sub chassis 8 when the lid 5 is closed and the sub chassis 8 is pushed backwardly (in the direction shown by the arrow b in FIG. 3). In the illustrated example, the transparent window 17 is wider near the supply reel drive shaft 13 (see FIGS. 1 and 2).

The front panel 6 includes the transparent window 18 formed at such proper portion thereof that the user can visually confirm a label area provided on the rear surface of the tape cassette C when the tape cassette C is loaded into the cassette holder 15. In the illustrated example, the front panel 6 includes the transparent window 18 of rectangular shape formed on its upper half portion.

Because the tape cassette C used in the portable tape player 1 according to this embodiment includes a front lid L and a slider S that close a tape withdrawing opening portion of the front surface side and reel drive shaft insertion apertures, the sub chassis 8 includes a front lid releasing member 19 and the cassette insertion portions 15a, 15a of the cassette holder 15 include slider lock releasing portions and engagement portions (not shown) that release the locked state of the slider S and that engage the slider S.

As illustrated, the lid 5 and the sub chassis 8 are released from being locked by operating an eject knob 20. The tape cassette C also is ejected by operating this eject knob 20.

Figure 8:
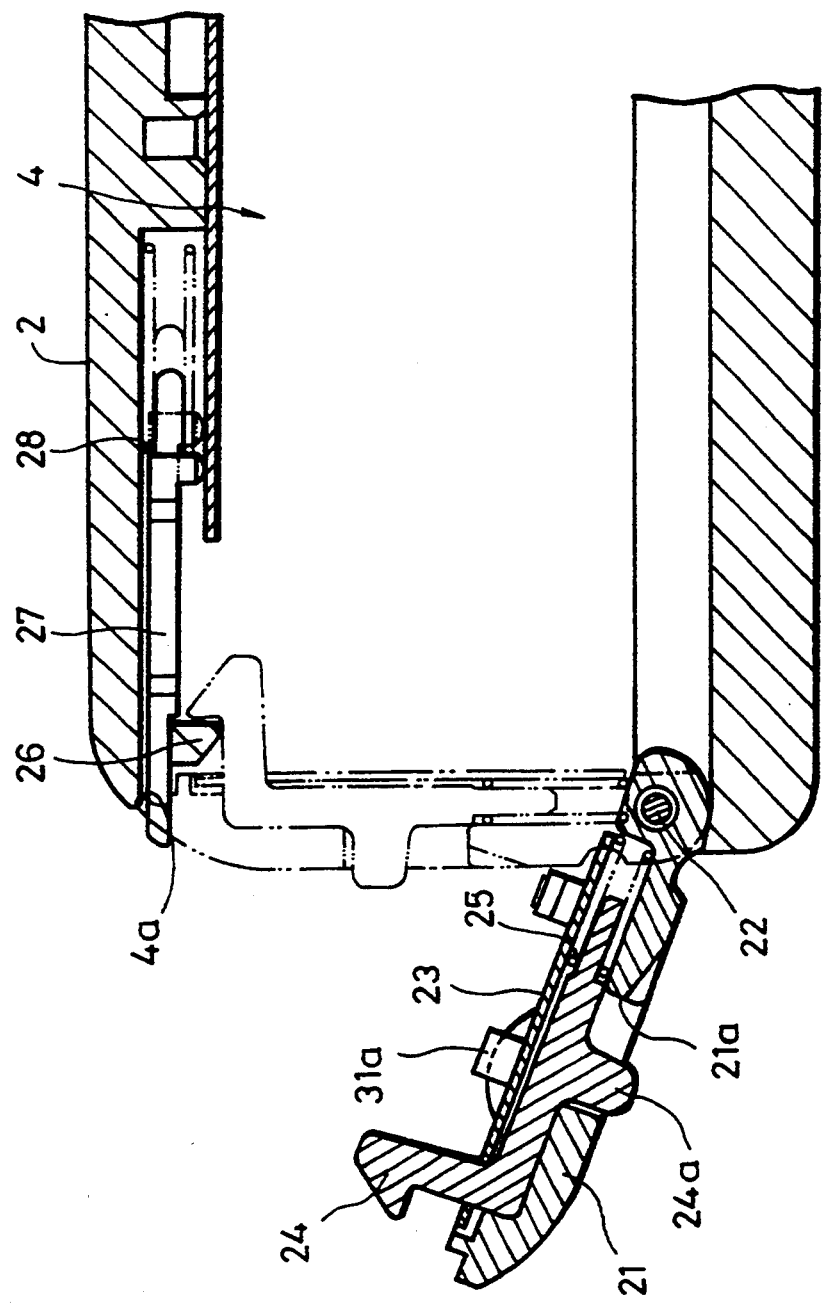
FIG. 8 is a fragmentary cross-sectional view showing the tape cassette player according to another embodiment of the present invention in an enlarged scale under the condition that the battery lid of the battery accommodating portion is opened.
Figure 9:
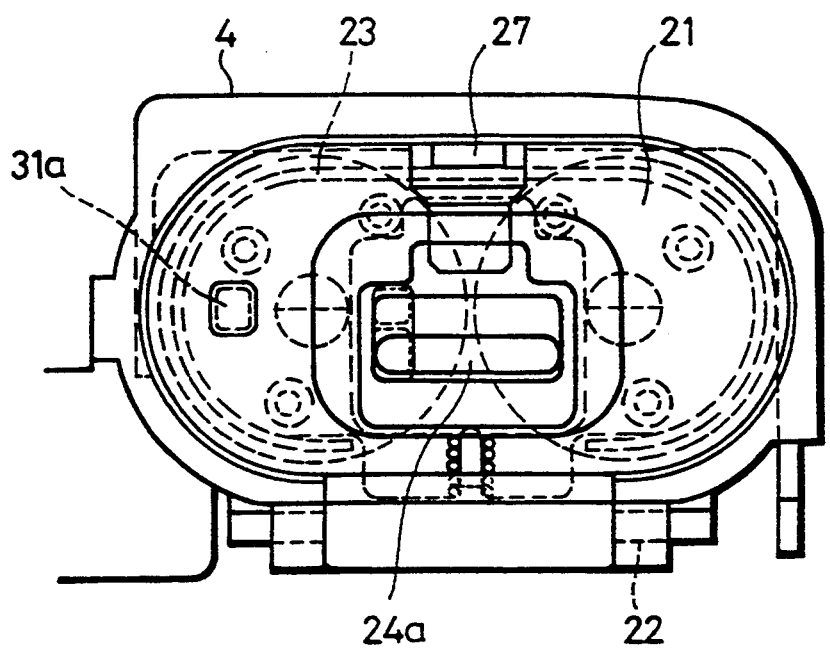
FIG. 9 is a front view thereof.

A battery lid 21 having a terminal contact member 23 includes a battery mis-insertion preventing tab 31a which is projected at the plus side contact portion of the terminal contact member 23 in a second embodiment of the present invention shown in FIGS. 8 and 9.

Figure 4:
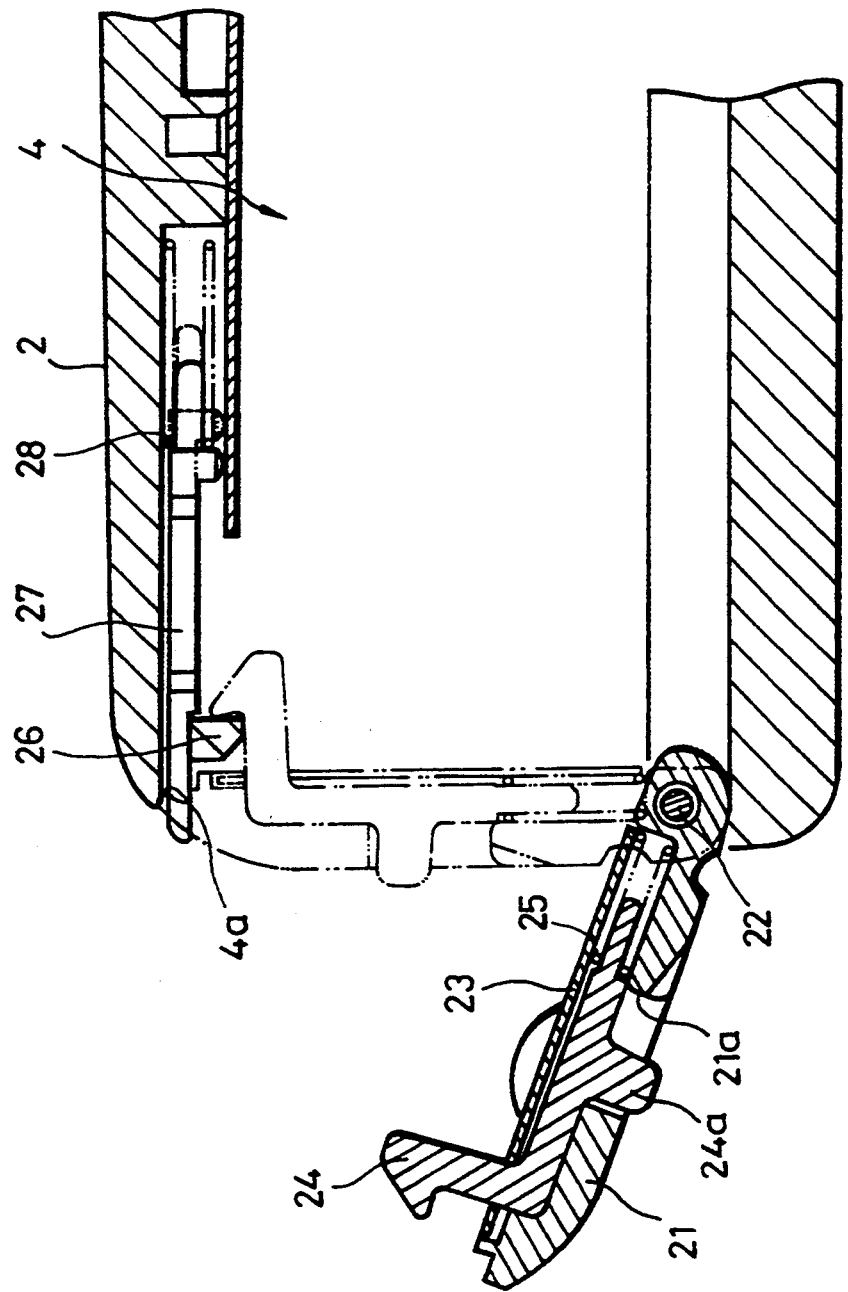
FIG. 4 is a fragmentary cross-sectional view showing in an enlarged scale the state that a battery lid of a battery accommodating portion of the cassette tape player is opened.

The battery accommodating portion 4 that adjoins the accommodating housing portion 3 thus arranged is made open toward the rear surface side of the outer housing 2 to form an opening portion 4a. The battery lid 21 that opens and closes this opening portion 4a is pivotally provided at the lower edge of the opening portion 4a by a shaft pin 22 so as to become rotatable as shown in FIG. 4. The battery lid 21 includes on its inner surface side the terminal contact member 23 fixed and a locking hook 24 attached so as to become slidable in the upper and lower direction. The locking hook 24 is constantly biased in the upward direction under spring force of a spring 25, for being engaged with a hook engagement tab 26 projected on the upper edge portion of the opening portion 4a thereby. The locking hook 24 is released from the locked state by pressing its projection 24a projected outwardly from a guide window 21a bored through the battery lid 21.

The battery accommodating portion 4 includes on its upper inner surface side a pushing member 27 attached so as to become slidable in the inner and outer direction. This pushing member 27 is constantly biased outwardly under spring force of a spring 28 such that a tip end portion thereof is projected outwardly from the opening portion 4a by a predetermined length. Therefore, the pushing member 27 pushes the battery lid 21 when the battery lid 21 is released from the locked state.

Figure 5:
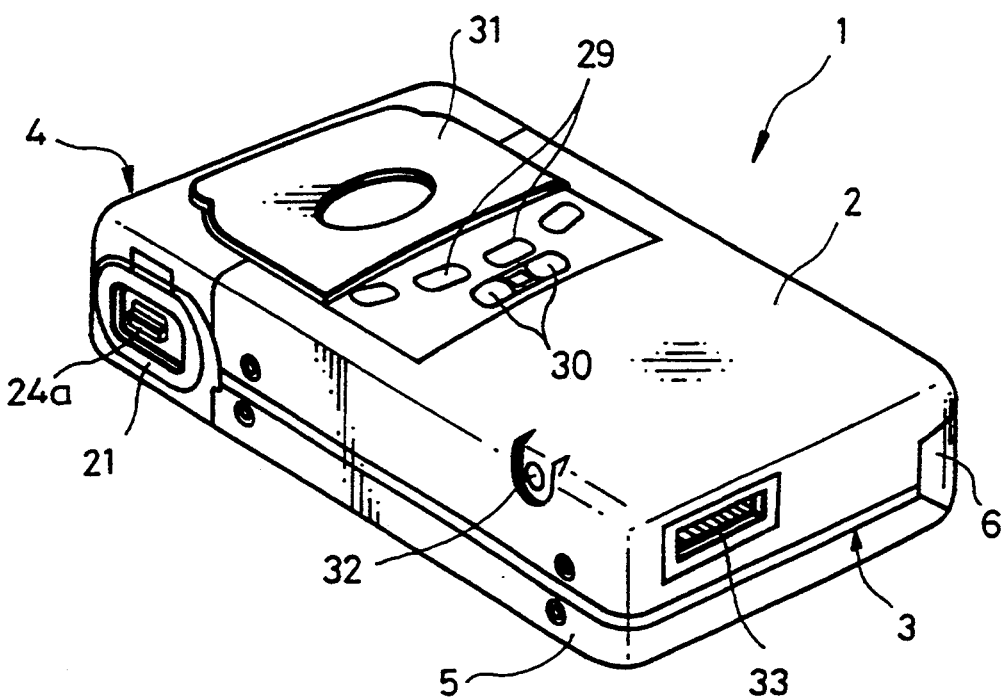
FIG. 5 is a perspective view showing the cassette tape player of FIG. 1 from a certain direction of the lower surface side under the condition that its hold shutter is opened.
Figure 6:
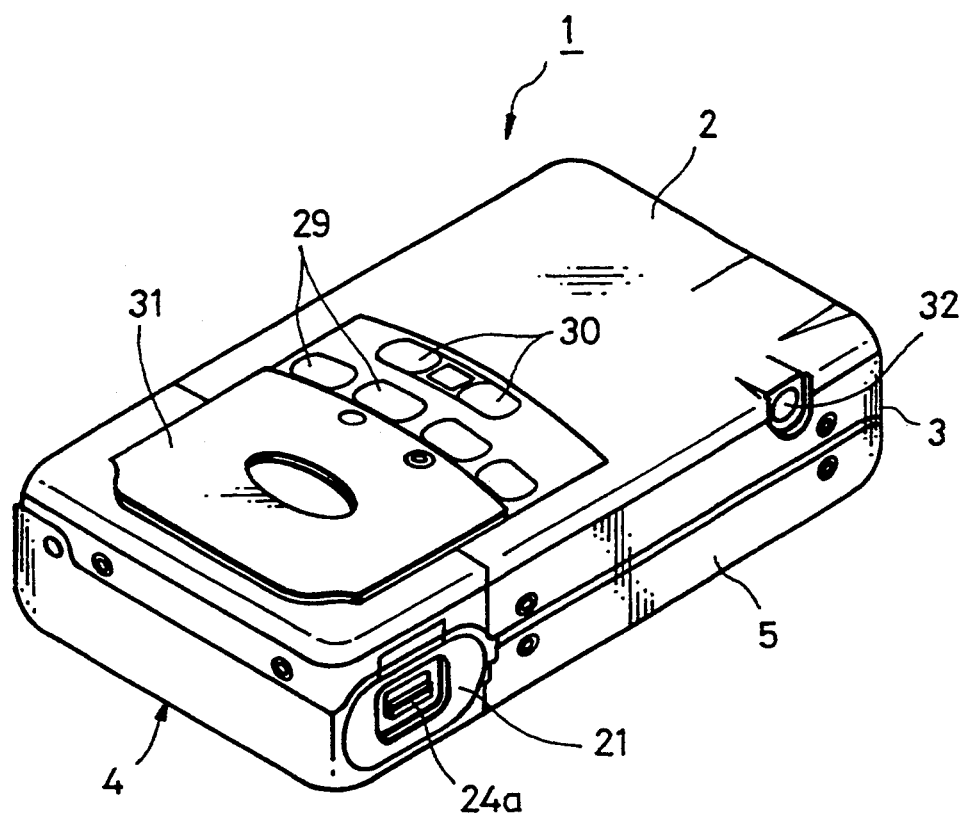
FIG. 6 is a perspective view showing the cassette tape player of FIG. 1 from other direction of the lower surface side.
Figure 7:
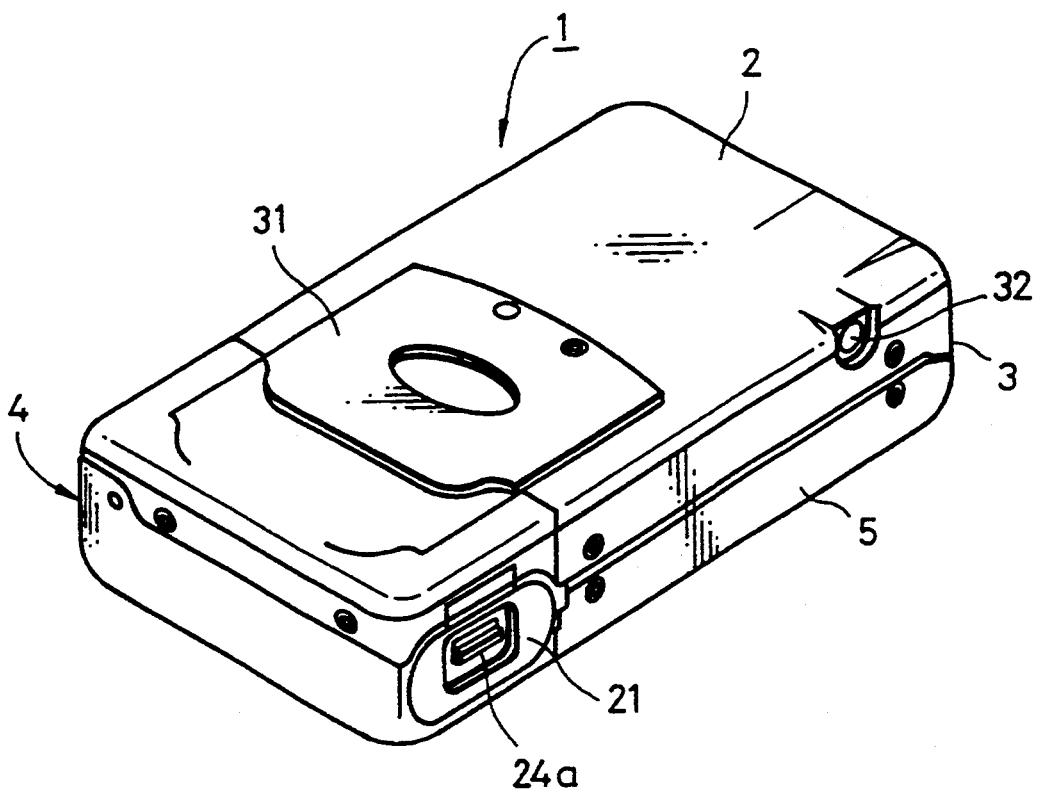
FIG. 7 is a perspective view showing the tape cassette player of FIG. 1 from the lower surface side under the condition that the holder shutter is closed.

As shown in FIGS. 5 and 6, the outer housing 2 includes tape operation buttons 29 of respective functions and sound volume adjusting buttons 30 disposed on its lower surface. A hold shutter 31 opens and closes the outer housing 2 at its surface in which these buttons 29, 30 are disposed, i.e., the holder shutter 31 covers the buttons 29, 30 so that the buttons 29, 30 can be prevented from being operated unintentionally.

Further, the outer housing 2 includes a headphone jack 32 attached to its rear surface as shown in FIGS. 5 and 6 and a remote controller/headphone jack 33 attached to its side surface side as shown in FIG. 5.

Figure 2:
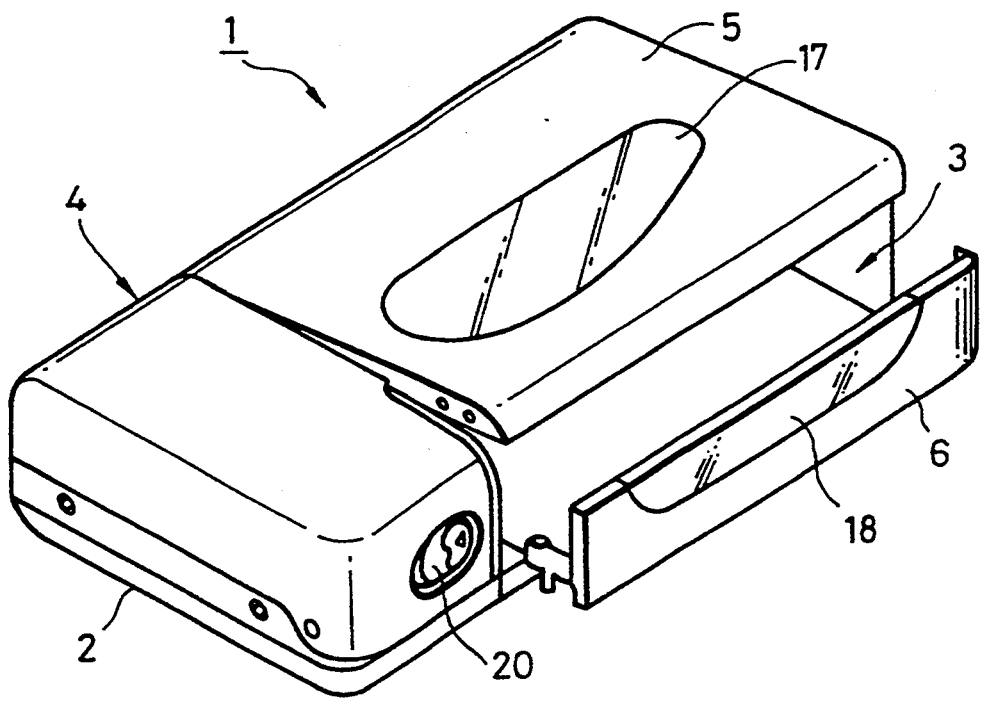
FIG. 2 is a perspective view showing the cassette tape player of FIG. 1 with its lid being opened.

When the tape cassette C is loaded into the accommodating housing portion 3 of the portable tape player 1 thus arranged, the lid 5 and the sub chassis 8 are released from the locked state by operating the eject knob 20 with the result that, as shown in FIG. 2, the lid 5 is lifted about the shaft supporting portion of the rear portion thereof under spring force of the spring biasing means and that the sub chassis 8 is protrusively slid in the forward direction under spring force of the spring-biasing means.

When the lid 5 is pushed upwardly and opened in the above-mentioned state, as shown in FIG. 3, the cassette holder 15 is elevated in unison with the cam plate 6 that is slid by the opening operation of the lid 5. Thus, the cassette holder 15 is projected from the upper surface side 3a of the accommodating housing portion 3 and placed above the front panel 6.

Subsequently, when the tape cassette C is inserted into the cassette holder 15, the cassette holder 15 comes in engagement with the tape cassette C under the condition that the slider S is released from the locked state. In this state, if the tape cassette C is further pushed, then the slider S and the tape cassette C are moved relatively, whereby the lower surface side of the tape withdrawing opening portion and the reel drive shaft insertion apertures of the tape cassette C are opened and the lower edge of the front lid L is opposed to the releasing member 19 disposed on the sub chassis 8.

Thereafter, when the lid 5 is closed, the cassette holder 15 is moved downwardly through the cam plate 16 and placed on and engaged with the sub chassis 8. Concurrently with the downward movement of the cassette holder 15, the reel drive shafts 13, 14 on the sub chassis 8 are inserted into the reel drive shaft insertion apertures of the tape cassette C and the moving guide roller group is inserted into the tape withdrawing mouth portion from the lower surface side and then placed at the inside of the magnetic tape. On the other hand, the front lid L is rotated upwardly when it is engaged with the releasing member 19, thereby the front surface side of the tape withdrawing mouth portion being opened.

Under this condition, when the sub chassis 8 is pushed inside by pushing the front panel 6, the cassette holder 15 is moved in unison therewith, thereby placing the tape cassette C in such a state that the tape withdrawing mouth portion thereof is opposed to the rotary head cylinder 9, the inclined guide roller 10 and the inclined guide 11 on the main chassis 7 and that the magnetic tape is withdrawn via the aforementioned guide roller group and then wound on the rotary head cylinder 9. That is, the magnetic tape accommodated within the tape cassette C is loaded and enabled to travel along the tape path formed by the guide rollers and guide post group.

In this fashion, the tape cassette C is accommodated within the tape cassette accommodating portion 3 and the upper surface portion 3a of the accommodating housing portion 3 is closed by the lid 5. Also, the front surface portion 3b is closed by the front panel 6.

In this state, the user can visually confirm the wound state of the magnetic tape accommodated in the tape cassette C through the transparent window 17 formed though the lid 5. Also, the user can visually confirm the label area c of the tape cassette C through the transparent window 18 formed through the front panel 6.

When the battery is accommodated in the battery accommodating portion 4 or the battery is exchanged, the battery lid 21 is released from the locked state and then opened by releasing the locking hook 24 from the hook engagement tab 26 by operating the projection 24a. If the battery lid 21 is released from the locked state when the battery lid 21 is opened, the pushing member 27 is biased and slid outwardly under spring force of the spring 28 to push the battery lid 21, whereby the battery lid 21 is lifted relative to the opening portion 4a of the battery accommodating portion 4. Thus, the user can open the battery lid 21 easily with the fingertip on the upper edge portion (free end portion) of the battery lid 21.

When the battery lid 21 is closed, the pushing member 27 is pushed inside against the spring force of the spring 28 from the outer surface side and the locking hook 24 comes in engagement with the hook engagement tab 26 only by pushing the battery lid 21 from the outer surface side, whereby the battery lid 21 closes the opening portion 4a of the battery accommodating portion 4 and is held in that state.

When the tape is played back under the condition that the tape cassette C is loaded and accommodated in the cassette accommodating housing portion 3 and that the battery is accommodated in the battery accommodating portion 4, a headphone (not shown) is connected to the headphone jack 32 or a remote controller unit (not shown) is connected to the remote controller/headphone jack 33 and the headphone is connected to the remote controller unit.

When this playback operation is carried out on the portable tape player body side, the installation portion of the tape operation buttons 29 and the sound volume adjusting buttons 30 is opened by sliding the hold shutter 31 on the lower surface of the outer housing 2 and then the respective buttons 29, 30 are operated. After the respective buttons 29, 30 were operated and when this portable tape player is not in use, the buttons 29, 30 can be prevented from being operated unintentionally by closing the hold shutter 31. When the tape is played back via the remote controller, the hold shutter 31 need not be opened and closed.

While the present invention is applied to the portable tape player as described above, the present invention is not limited thereto and may be applied to cabinets of a variety of electronic equipments.

According to the present invention, in the accommodating apparatus for a recording medium cassette, the cassette accommodating portion includes the transparent windows formed through the surfaces of at least two different portions thereof so that the user may visually confirm the state of the tape cassette. Therefore, the user can see the tape cassette accommodated in the cassette accommodating housing portion from the direction of the surfaces of two portions and visually confirm the accommodated state of the tape cassette with ease. In particular, when the present invention is applied to the cassette tape player, the user can visually confirm both the tape remaining amount of the tape cassette and the label area formed on the peripheral side wall of the tape cassette. In actual practice, there are then large advantages because the user can visually confirm the recording, playback and contents of the tape simultaneously and that this cassette tape player is advantageous in strength as compared with a cassette tape player having a window of a large surface area formed on the surface of only one portion. Hence, the present invention is most suitable for use with a portable cassette tape player or the like and a marketability thereof or the like can be improved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A cassette accommodating type electronic device having an electronic equipment housing which comprises:
    a cassette accommodating portion for accommodating therein a tape cassette in which a recording medium is accommodated;
    said housing having formed therein an opening portion through which said tape cassette is inserted into said cassette accommodating portion;
    driving means for driving said recording medium of said cassette accommodated in said cassette accommodating portion;
    a lid for opening and closing said opening portion;
    a front panel cooperating with the lid for opening and closing the opening portion, said front panel being adjacent to a side of said tape cassette opposite to a second side of said tape cassette having an opening providing access to said recording medium when said tape cassette is resting in said cassette accommodating portion and said lid is in a closed position; and
    a first transparent window formed through a surface of said lid and a second transparent window formed through a surface of said front panel so that two different cassette surfaces of said tape cassette accommodated in said cassette accommodating portion can be visually identified.

2. A cassette accommodating type electronic device according to claim 1, wherein said lid is formed of a plate-shaped member rotatably supported to said electronic equipment housing and includes the first transparent window formed therethrough.

3. A cassette accommodating type electronic device according to claim 2, wherein the front panel through which the second transparent window is formed is substantially orthogonal to said lid in a closed position.

4. A cassette accommodating type electronic device according to claim 1, further comprising a battery loading portion in which a battery that supplies a driving voltage to said driving means is loaded and said apparatus can be portable.

5. A cassette accommodating type electronic device according to claim 1, wherein said recording medium accommodated in said tape cassette is a tape-shaped medium and the first of said two transparent windows permits visual identification of a tape remaining amount and the second of said two transparent windows permits visual identification of a cassette display portion formed on said tape cassette.

6. A cassette accommodating type electronic device having a housing of a substantially rectangular solid configuration having six major outer side walls and a cassette accommodating portion adapted for accommodating a tape cassette having a recording medium accommodated in a cassette chassis thereof, which comprises:
    drive means for driving said recording medium;
    said housing having formed therein an opening portion through which said tape cassette is inserted into said cassette accommodating portion;
    a lid member for opening and closing said opening portion and forming part of a first one of said six outer side walls of said housing when closed;
    a front panel cooperating with the lid for opening and closing the opening portion and forming part of a second one of said six outer side walls, said front panel being adjacent to a side of said tape cassette opposite to a second side of said tape cassette having an opening providing access to said recording medium when said tape cassette is resting in said cassette accommodating portion and said lid member is in a closed position;

a cassette holder elevatedly supported relative to said cassette accommodating portion and elevatedly moved in unison with an opening and a closing operation of said lid member between a first position at which said cassette holder holding said tape cassette is accommodated in said cassette accommodating portion and a second position at which said tape cassette can be ejected from said cassette holder; and a battery loading portion in which a battery that supplies a driving voltage to said driving means is loaded so that said apparatus can be portable, wherein a first transparent window is formed through a surface of said lid and a second transparent window is formed through a surface of said front panel so that two different cassette surfaces of said tape cassette accommodated in said cassette accommodating portion can be visually identified.

7. A cassette accommodating type electronic device according to claim 6, wherein said first and second outer side walls are substantially mutually perpendicular and intersect, said opening portion is formed on said housing subjacent to said first and second outer side walls, and said lid member is formed of a pair of lid bodies opposing said opening portion.

8. A cassette accommodating type electronic device according to claim 7, wherein said first transparent window is formed through surfaces of said pair of lid bodies.

* * * * *